US011049275B2

(12) United States Patent
Liu et al.

(10) Patent No.: US 11,049,275 B2
(45) Date of Patent: Jun. 29, 2021

(54) METHOD OF PREDICTING DEPTH VALUES OF LINES, METHOD OF OUTPUTTING THREE-DIMENSIONAL (3D) LINES, AND APPARATUS THEREOF

(71) Applicant: SAMSUNG ELECTRONICS CO., LTD., Suwon-si (KR)

(72) Inventors: Zhihua Liu, Beijing (CN); Leewon Hee, Yongin-si (KR); Lin Ma, Beijing (CN); Qiang Wang, Beijing (CN); Tianhao Gao, Beijing (CN); Yamin Mao, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 16/550,985

(22) Filed: Aug. 26, 2019

(65) Prior Publication Data
US 2020/0160547 A1 May 21, 2020

(30) Foreign Application Priority Data

Nov. 21, 2018 (CN) .......................... 201811389001.4
Mar. 12, 2019 (KR) .......................... 10-2019-0028175

(51) Int. Cl.
*G06T 7/593* (2017.01)
*G06T 5/00* (2006.01)
(Continued)

(52) U.S. Cl.
CPC ............ *G06T 7/593* (2017.01); *G06K 9/6211* (2013.01); *G06N 3/0454* (2013.01); *G06T 5/002* (2013.01);
(Continued)

(58) Field of Classification Search
CPC ........... G06T 7/593; G06T 5/002; G06T 5/50; G06N 3/0454; G06K 9/6211
(Continued)

(56) References Cited

U.S. PATENT DOCUMENTS

| 2010/0086218 | A1* | 4/2010 | Tateno ............... G06K 9/00208 |
| | | | 382/203 |
| 2014/0218486 | A1* | 8/2014 | Kobayashi ............. G03B 35/10 |
| | | | 348/49 |
| 2016/0171755 | A1* | 6/2016 | Karsch .................. G06T 15/506 |
| | | | 382/154 |

FOREIGN PATENT DOCUMENTS

| KR | 10-2015-0068196 A | 6/2015 |
| KR | 10-1845769 B1 | 4/2018 |

(Continued)

OTHER PUBLICATIONS

Neven, Davy, et al., "Towards End-to-End Lane Detection: an Instance Segmentation Approach", Feb. 2018, pp. 1-7.
(Continued)

*Primary Examiner* — Ayodeji O Ayotunde
(74) *Attorney, Agent, or Firm* — NSIP Law

(57) ABSTRACT

A method and apparatus for outputting three-dimensional (3D) lines. The apparatus acquires a first image and a second image including lines on a road, generates, based on a first feature map acquired from the first image, a line probability map representing a probability that a pixel point of the first feature map belongs to the lines, calculates matching information of the first image and the second image based on the first feature map and a second feature map acquired from the second image, predicts depth values of the lines using the line probability map and the matching information, detects the lines based on the line probability map, generates 3D
(Continued)

lines based on the detected lines and the depth values of the lines, and outputs the 3D lines.

25 Claims, 13 Drawing Sheets

(51) Int. Cl.
 *G06T 5/50* (2006.01)
 *G06N 3/04* (2006.01)
 *G06K 9/62* (2006.01)
(52) U.S. Cl.
 CPC ...... *G06T 5/50* (2013.01); *G06T 2207/20076* (2013.01); *G06T 2207/20084* (2013.01)
(58) Field of Classification Search
 USPC ........................................................ 382/181
 See application file for complete search history.

(56) References Cited

FOREIGN PATENT DOCUMENTS

| KR | 10-1866075 B1 | 6/2018 |
| KR | 10-1869266 B1 | 6/2018 |

OTHER PUBLICATIONS

Liang, Dun, et al., "LineNet: a Zoomable CNN for Crowdsourced High Definition Maps Modeling in Urban Environments", Jul. 2018, pp. 1-11.

* cited by examiner

FIG. 11

```
Input: Tracked lines by last frames, detected lines
Out:   Selected lines set, Updated tracked lines
for i = 1, 2, ..., trackedlines.size( ) do
    for j = 1, 2, ..., detecdlines.size( ) do
        Calculate the distance between trackedlines[i] and detectedlines[j];
    end
    find the min distance and the corresponding detectedlines[match]
    if mindistance < threshold_distance then
        put the detected lines into the selected lines set;
        using the detectedlines[match] update the trackedlines[i]
        trackedlines[i].score += detectedlines[match].length ;
    else
        trackedlines[i].score -= 100 ;
    end
end
for i = 1, 2, ..., detecdlines.size( ) do
    if detecdlines[i] not matching then
        Calculate the mindistance between trackedlines and detectedlines[i];
        if mindistance > threshold then
            put the detecdlines[i] into the trackedlines set;
        end
        if detecdlines[i].confidence < threshold then
            delete the detectedlines[i] from the detectedlines set;
        end
    end
end
```

METHOD OF PREDICTING DEPTH VALUES OF LINES, METHOD OF OUTPUTTING THREE-DIMENSIONAL (3D) LINES, AND APPARATUS THEREOF

CROSS-REFERENCE TO RELATED APPLICATIONS

This application claims the benefit under 35 USC § 119(a) of Chinese Patent Application No. 201811389001.4 filed on Nov. 21, 2018 in the State Intellectual Property Office of the People's Republic of China and Korean Patent Application No. 10-2019-0028175 filed on Mar. 12, 2019 in the Korean Intellectual Property Office, the entire disclosures of which are incorporated herein by reference for all purposes.

BACKGROUND

1. Field

The following description relates to a method of predicting depth values of lines, a method of outputting three-dimensional (3D) lines, and an apparatus thereof.

2. Description of Related Art

Three-dimensional (3D) line identification is important for driving assistance. In addition, an estimation of a distance from an object included in a driving image is important for predicting, for example, ahead car, lane, pedestrian, or an obstacle in advance.

Generally, in a city, a complex road image including a lane division, a merged lane sign, a large curvature lane, an intersection mark, and a curve mark may be obtained. Thus, a driving assistance system may need to identify various types of lines. In addition, rigorous assumptions such as a parallel state of an imaging device and a road may be required when identifying a 3D line obtained through a conversion based on a bird eye's view. Thus, a driving situation to which a method of identifying a 3D line based on a bird eye's view to be applied may be limited. In addition, since most neural networks identify a 3D line through a processing of an image frame, it is difficult to obtain global structural information on the entire image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of outputting three-dimensional (3D) lines includes acquiring a first image including lines on a road and a second image including the lines on the road, generating, based on a first feature map acquired from the first image, a line probability map representing a probability that a pixel point of the first feature map belongs to the lines, calculating matching information of the first image and the second image based on the first feature map and a second feature map acquired from the second image, predicting depth values of the lines using the line probability map and the matching information, detecting the lines based on the line probability map, generating 3D lines based on the detected lines and the depth values of the lines, and outputting the 3D lines.

The generating of the line probability map may include extracting a line segment on the first feature map, generating a binary image representing a probability that a pixel point of the first feature map belongs to the lines based on the line segment, and generating the line probability map based on the binary image.

The calculating of the matching information of the first image and the second image may include calculating a correlation coefficient of pixel points included in the first feature map and pixel points included the second feature map and calculating matching information of the first image and the second image based on the correlation coefficient.

The predicting of the depth values of the lines may include calculating a disparity between the first image and the second image based on the line probability map and the matching information and predicting the depth values of the lines according to a disparity map based on the disparity.

The calculating of the disparity may include acquiring new matching information by overlaying the matching information with the line probability map, smoothing adjacent pixel points by filtering the new matching information, and removing noise of the new matching information, and acquiring the disparity between the first image and the second image based on a result of the smoothing and removing.

The detecting of the lines based on the line probability map may include extracting line segments corresponding to the lines based on the line probability map, selecting candidate lines by clustering the line segments, determining at least one candidate line corresponding to the lines among the candidate lines, and detecting the lines by fitting the determined at least one candidate line into a curve fitting model.

The extracting of the line segments may include extracting pixel points on a line from the line probability map, calculating distances between the extracted pixel points, acquiring sub-segments by combining the extracted pixel points based on the distances between the extracted pixel points, and extracting the line segments by connecting the sub-segments based on a distance between the sub-segments.

The selecting of the candidate lines by clustering the line segments may include calculating an energy function corresponding to each of combinations of line segments included in a candidate line set based on lengths of the line segments, the candidate line set including line segments having lengths greater than a threshold length, selecting at least one combination from the combinations of the line segments based on whether the energy function satisfies a preset condition, clustering the line segments by performing curve fitting on the line segments based on the selected combination, and selecting the clustered line segments as the candidate lines.

The calculating of the energy function may include calculating an energy function corresponding to each of combinations of line segments included in the candidate line set.

The calculating of the energy function may include calculating an energy function corresponding to each of combinations of the line segments using a conditional random fields (CRF) graph.

The calculating of the energy function may include calculating a unitary function between the line segments and a pairing function with which the unitary function constitutes a pair based on the CRF graph and calculating the energy function based on the unitary function and the pairing function.

The determining of at least one candidate line corresponding to the lines among the candidate lines may include calculating a distance between each of the candidate lines and a previous line included in a previous line set, calculating a matching score by matching each of the candidate lines and the previous line based on the distance between each of the candidate lines and the previous line, and determining at least one candidate line corresponding to the lines based on the matching score.

The method may further include updating information on the previous line including the matching score based on a result of the matching between each of the candidate lines and the previous line.

The updating of the information on the previous line may include at least one of updating a matching score of the previous line, updating an authenticity state of the previous line indicating whether the previous line corresponds to an actual line, and removing the previous line from the previous line set.

The acquiring of the first image and the second image may include capturing the first image and the second image using a stereo camera or two cameras located at a same horizontal position on a vehicle.

The method may further include extracting first line features from the first image using a first neural network, acquiring the first feature map based on the first line features, extracting second line features from the second image using a second neural network, and acquiring the second feature map based on the second line features.

The first neural network and the second network may share weight parameters.

The acquiring of the first feature map and the second feature map may include acquiring the first feature map and the second feature map by performing an edge detection on each of the first image and the second image.

In another general aspect, a method of predicting depth values of lines includes acquiring a first image including lines on a road and a second image including the lines on the road, generating, based on a first feature map acquired from the first image, a line probability map representing a probability that a pixel point of the first feature map belongs to the lines, calculating matching information of the first image and the second image based on the first feature map and a second feature map acquired from the second image, and predicting depth values of the lines using the line probability map and the matching information.

The generating of the line probability map may include extracting a line segment on the first feature map, generating a binary image representing a probability that a pixel point of the first feature map belongs to the lines based on the line segment, and generating the line probability map based on the binary image.

The calculating of the matching information of the first image and the second image may include calculating a correlation coefficient of pixel points included in the first feature map and the second feature map and calculating the matching information of the first image and the second image based on the correlation coefficient.

The predicting of the depth values of the lines may include calculating a disparity between the first image and the second image based on the line probability map and the matching information and predicting the depth values of the lines according to a disparity map based on the disparity.

The calculating of the disparity may include acquiring new matching information by overlaying the matching information with the line probability map, smoothing adjacent pixel points by filtering the new matching information, and removing noise of the new matching information, and acquiring the disparity between the first image and the second image based on a result of the smoothing and removing.

In still another general aspect, an apparatus for outputting 3D lines includes sensors configured to acquire a first image including lines on a road and a second image including the lines on the road, and a processor configured to generate, based on a first feature map acquired from the first image, a line probability map representing a probability that a pixel point of the first feature map belongs to the lines, calculate matching information of the first image and the second image based on the first feature map and a second feature map acquired from the second image, predict depth values of the lines using the line probability map and the matching information, detect the lines based on the line probability map, generate 3D lines based on the detected lines and the depth values of the lines, and output the 3D lines.

Other features and aspects will be apparent from the following detailed description, the drawings, and the claims.

BRIEF DESCRIPTION OF DRAWINGS

FIG. 11 illustrates an example of a program coding that represents a method of identifying a line by excluding a line determined as false positive based on a matching score.

Figure 1:
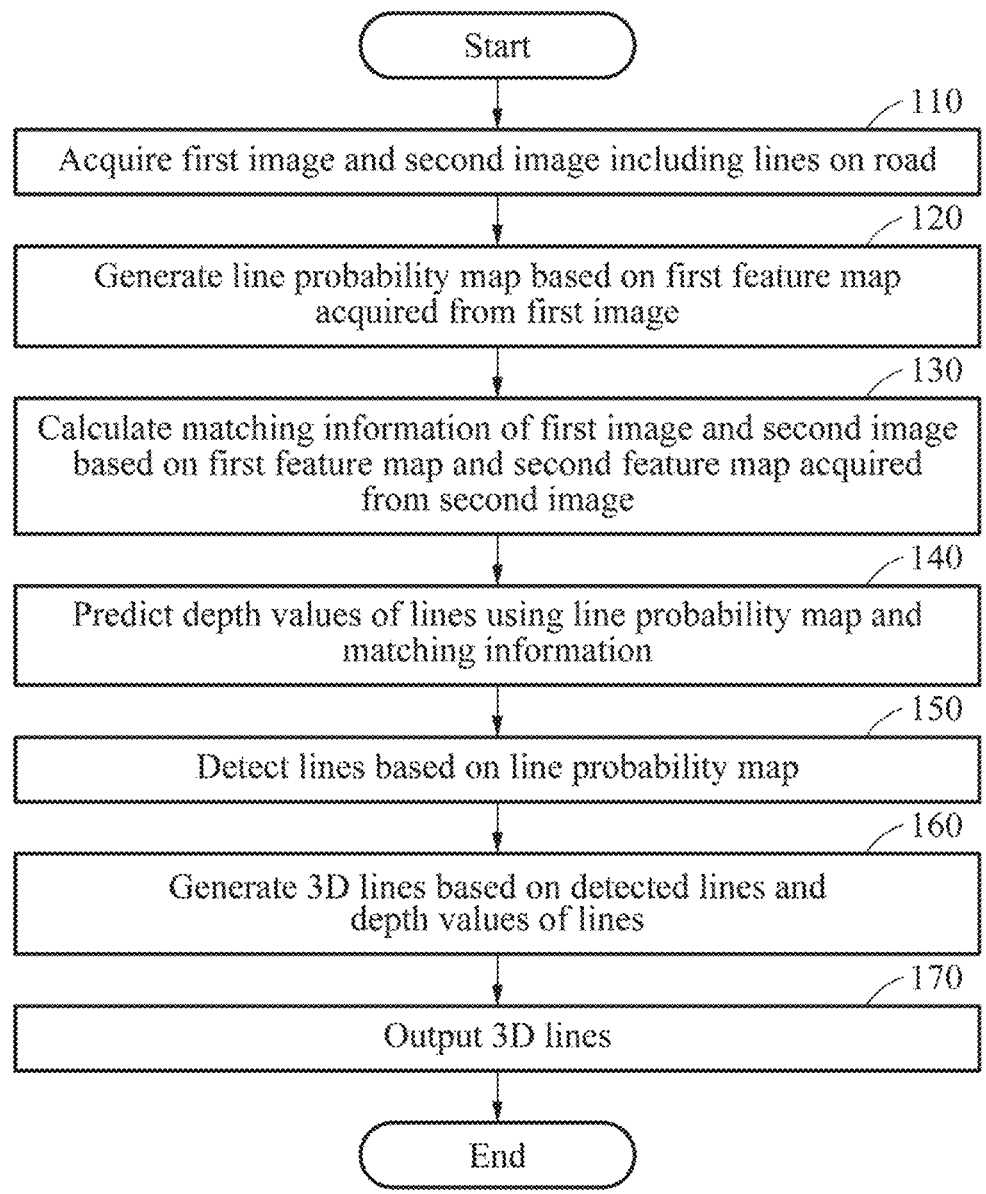
FIG. 1 illustrates an example of a method of outputting three-dimensional (3D) lines.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

FIG. 1 is a flowchart illustrating an example of a method of outputting three-dimensional (3D) lines. Referring to FIG. 1, in operation 110, an apparatus for outputting 3D lines (hereinafter, also referred to as "output apparatus") acquires a first image and a second image including lines on a road. The output apparatus may use, for example, sensors to capture a first view and a second view of the road and acquire the first image and the second image. The sensors may be arranged in the same horizontal line, for example a horizontal position on a vehicle. The sensors may be, for example, an image sensor, a vision sensor, a camera sensor, and/or a stereo camera. Depending on an example, the output apparatus may acquire the first image and the second image from an outside of the output apparatus through a communication interface. For example, the first image may be a left image and the second image may be a right image. Also, for example, the first image may be a right image and the second image may be a left image. The first image and the second image may be, for example driving images having a disparity.

In operation 120, the output apparatus generates a line probability map based on a first feature map acquired from the first image. The output apparatus acquires first line features from the first image using, for example, a first neural network. The output apparatus acquires the first feature map based on the first line features. The output apparatus extracts the first line features by performing edge detection on the first image using, for example, a Canny operator.

In operation 120, the output apparatus extracts at least one line segment on the first feature map using, for example, a Hough transformation algorithm. The line segment may be indicated by, for example, a line segment position such as a start point S, a center point C, and an end point E, a line direction such as a start direction SD, a center direction CD, and an end direction ED, and a line angle.

In operation 120, the output apparatus generates a binary image representing a probability that a pixel point of the first feature map belongs to the lines based on the line segment. The output apparatus generates the line probability map based on the binary image. The output apparatus generates the line probability map using pixel points having a value not being equal to zero in the binary image. The term "line probability map" refers to a probability that a pixel point of the first feature map belongs to actual lines included in the first image. The line probability map may be, for example, a binary image that represents a probability of the pixel point of the first feature map being located on the line as "1" and represents a probability of the pixel point of the first feature map not being located on the line as "0". The output apparatus extracts the line segment from a non-zero pixel point at which a probability value of the line probability map is not "0". The output apparatus generates the line probability map based on an encoder-decoder network (refer to reference numeral 651 of FIG. 6) described with reference to FIG. 6. The line probability map may be, for example, a line probability map (refer to reference numeral 652 of FIG. 6).

In operation 130, the output apparatus calculates matching information of the first image and the second image based on the first feature map and a second feature map acquired from the second image. The output apparatus extracts second line features from the second image using a second neural network. The output apparatus acquires the second feature map based on the second line features. The first neural network and the second neural network may each be configured as, for example, a convolutional neural network (CNN) and may share weight parameters. The output apparatus acquires the second feature map by performing the edge detection on the second image using the Canny operator. Depending on an example, the first neural network and the second neural network may be provided as a single integrated neural network. The first neural network and the second neural network may include at least one of a contour that is an upper level semantic feature and an edge that is a lower level semantic feature.

In operation 130, the output apparatus calculates a correlation coefficient of pixel points included in the first feature map and the second feature map. The correlation relationship may also be referred to as "correlation". The correlation coefficient is acquired based on an inner product of first pixel points included in the first feature map and second pixel points included in the second feature map. As the inner product of the first pixel point and the second pixel point increases, the correlation between the first pixel point and the second pixel point also increases. A high correlation between the two pixel points may indicate that a probability of the first image matching the second image is relatively high.

The output apparatus calculates the matching information of the first image and the second image based on the correlation coefficient. For example, when a correlation coefficient between a pixel point $P1(x1, y1)$ of the first feature map and a pixel point $P2(xr, yr)$ of the second feature map is a positive inner product $P1(x1, y1) \cdot P2(xr, yr)$, matching information of the two pixel points may be represented as $P1(x1, y1) \cdot P2(xr, yr)$.

For example, a disparity between the first pixel points of the first feature map and the second pixel points corresponding to the first pixel points in the second feature map may be within a range of ten pixels. In this example, a search range of the second feature map corresponding to a pixel point (X,Y) of the first feature map may be, for example, a range of (Xr−10, Y) to (Xr, Y). Xr may be an X coordinate of the second image, for example, a right image. Here, "the second pixel points corresponding to the first pixel points in the second feature map" may be understood as second pixel points corresponding to the same object which corresponds to the first pixel points. For example, when the first pixel points of the first feature map are pixel points corresponding to a vehicle A, the second pixel points may be pixel points corresponding to the vehicle A in the second feature map.

The matching information includes, for example, a matching value matrix. The matching value matrix may represent, for example, one cube (X*Y*Z). Here, three axes X, Y, and Z may represent an X direction, a Y direction, and a Z direction, respectively. The X direction is referred as a horizontal direction. The Y direction is referred to as a vertical direction. The Z direction is referred to as a disparity direction. The Z direction is also referred to as a depth direction of a direction d. The matching information calculating process of operation 130 may be performed by, for example, a matching information calculating module (refer to reference numeral 615 of FIG. 6).

In operation 140, the output apparatus predicts depth values of lines using the line probability map and the matching information. The output apparatus calculates a disparity between the first image and the second image based on the line probability map and the matching information. The output apparatus predicts the depth values of the lines using a disparity map based on the disparity.

For each disparity, the output apparatus generates one intercept M*N by the inner product of the pixel points of the first image and the second image. In this example, a plurality of disparity segments is combined according to M*N*d.

The output apparatus calculates a depth value of lines according to Equation 1 below.

$$Z = \frac{b*f}{X_R - X_T} = \frac{b*f}{d} \quad \text{Equation 1}$$

In Equation 1, b denotes a distance between centers of two cameras that capture the first image and the second image, respectively, and f denotes a focal length between the two cameras. $X_R$ denotes a distance from a left edge of the first image to a pixel point of the first image. $X_T$ denotes a distance from a left edge of the second image to a pixel point of the second image. A difference between $X_R$ and $X_T$ is denoted by a disparity d.

Figure 6:
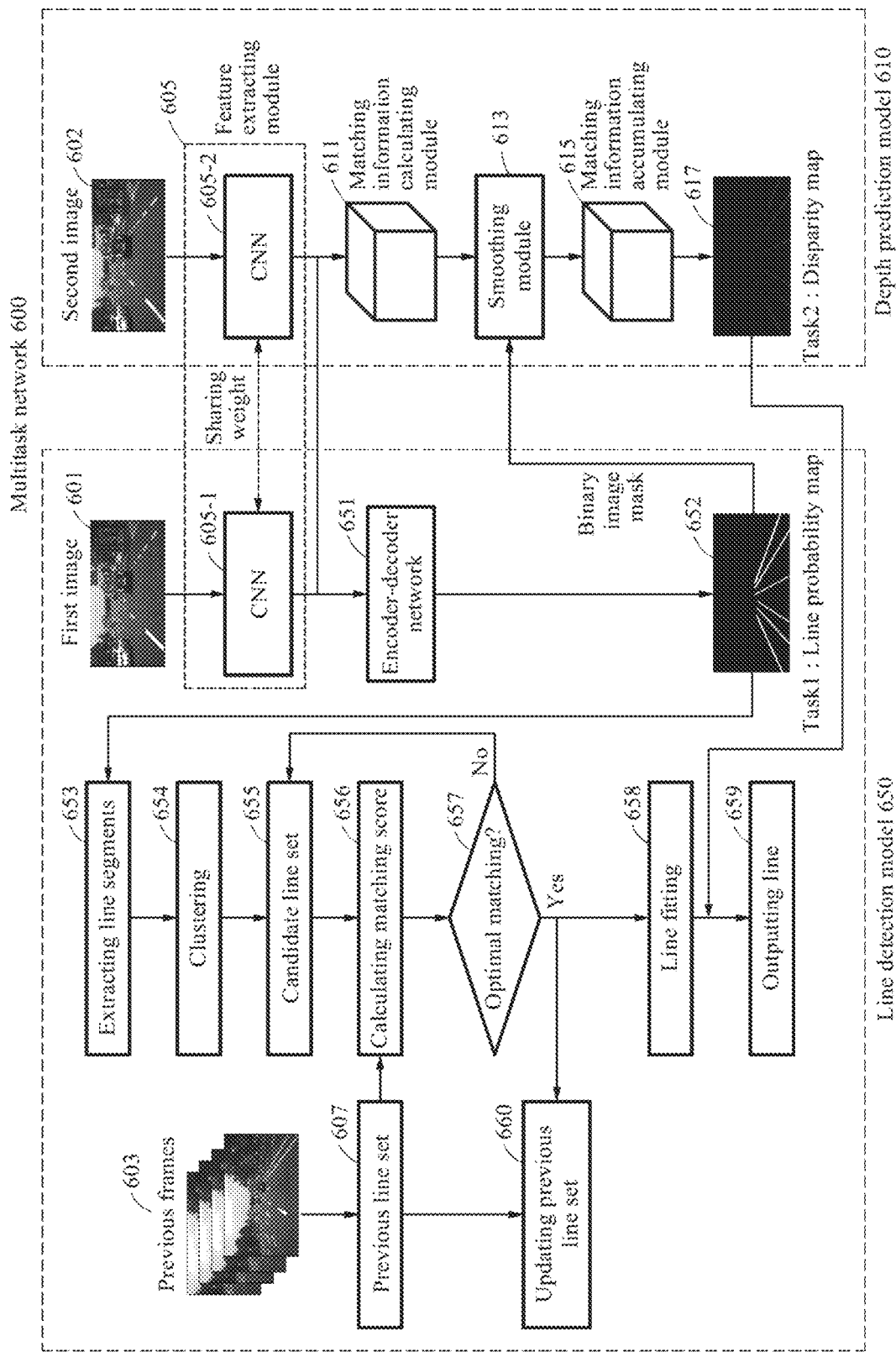
FIG. 6 illustrates an example of a structure of a multitask network outputting 3D lines.

The disparity map may be, for example, a disparity map (refer to reference numeral 617 of FIG. 6). A method of predicting a depth value of lines using the output apparatus will be described in detail with reference to FIG. 2.

In operation 150, the output apparatus detects lines based on the line probability map. The output apparatus extracts line segments corresponding to the lines based on the line probability map. The output apparatus selects candidate lines by clustering the line segments. When performing the clustering, the output apparatus acquires a line image set obtained after clustering, based on a CRF graph. The CRF graph will be further described later. The output apparatus receives a set of line segments extracted by a non-zero pixel point on the line probability map and outputs a line set including lines obtained after clustering.

For example, a road marking may be misinterpreted as a line on an initial line probability map. In this example, the output apparatus may identify segments of the line probability map and cluster line segments belongs to the same branch, that is, the same line. The output apparatus matches the clustered line segments as a new line of one branch and acquire a line image after clustering.

The output apparatus determines at least one candidate line corresponding to the lines from the candidate lines. The output apparatus detects the lines by fitting the determined candidate line into, for example, a curve fitting model. A method of detecting lines using the output apparatus will be described in detail with reference to FIG. 3.

In operation 160, the output apparatus generates 3D lines based on the detected lines and the depth values of the lines.

In operation 170, the output apparatus outputs the 3D lines.

Figure 2:
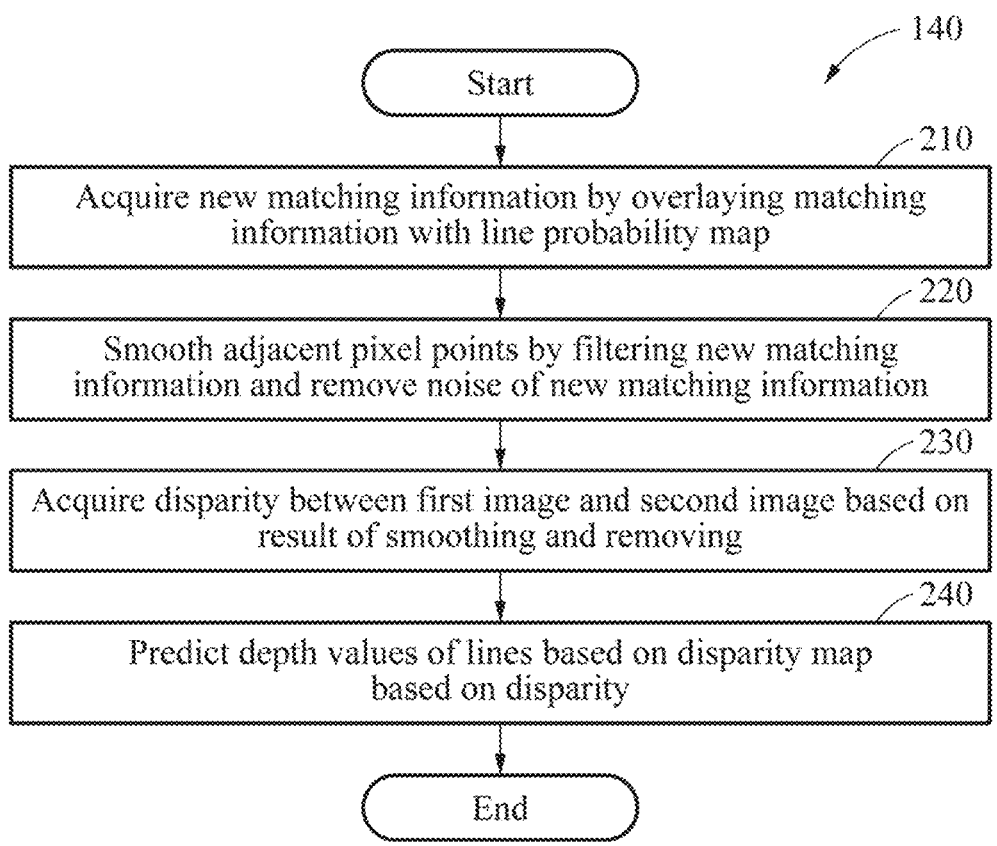
FIG. 2 illustrates an example of a method of calculating a disparity between a first image and a second image.

FIG. 2 is a flowchart illustrating an example of a method of calculating a disparity between a first image and a second image. Referring to FIG. 2, in operation 210, an output apparatus acquires new matching information by overlaying matching information with a line probability map. The output apparatus acquires new matching information by overlaying the matching information with a binary image mask based on the line probability map. For example, a size of the line probability map may be (M*N*1) and the matching information, that is a matching value matrix may be (M*N*D). Here, M denotes a height of an image, N denotes a width of the image, and D denotes a disparity range. The output apparatus obtains new matching information (M*N*(D+1)) by overlaying the matching information (M*N*D) with the (M*N*1)-sized line probability map. The output apparatus recognizes from the new matching information that the depths of the adjacent pixel points in the image are consecutive.

In operation 220, the output apparatus smooths adjacent pixel points by filtering the new matching information and removes noise of the new matching information. To achieve more smoothness of the disparity between the adjacent pixel points, the output apparatus performs filtering on the new matching information (M*N*(D+1)), which may significantly increase a spatial consecutiveness of the disparity between the adjacent pixels, and removes pixel points corresponding to noise.

For example, the output apparatus performs a smooth filtering for each line segment along the disparity direction on the new matching information (M*N*(D+1)) or the matching value matrix acquired in the previous operation. Also, the output apparatus controls the filtering using a color image. To prevent the smoothing from being performed outside an edge or boundary of the object, the output apparatus acquires boundary information or edge information based on the color image and performs the filtering within the same edge or the same boundary.

The output apparatus removes noise from an overlay result using a matching information accumulating module (refer to reference numeral 615 of FIG. 6). The output apparatus applies the binary image mask of the line probability map as an input of the matching information accumulating module for performing a matching value smoothing, thereby focusing more on a depth value of a line according to an attention mechanism when predicting the depth value. Through the foregoing process, the output apparatus may reduce an amount of calculation and improve a matching accuracy by removing pixel points corresponding to the noise in the matching information accumulating module. The smoothing and noise removal may be performed by, for example, a smoothing module (refer to reference numeral 613 of FIG. 6) and the matching information accumulating module (refer to reference numeral 615 of FIG. 6).

In operation 230, the output apparatus acquires a disparity between the first image and the second image based on a result of the smoothing and removing.

In operation 240, the output apparatus predicts depth values of lines based on a disparity map based on a disparity. The output apparatus generates a disparity map by accumulating disparities and/or matching information and predicts depth values of lines based on the disparity map.

The output apparatus predicts the depth values of the lines by an attention mechanism based on a disparity between the first image and the second image and a camera parameter such as a distance between a first camera center of the first image and a second camera center of the second image, a camera focal distance of the first image, and a camera focal distance of the second image.

The output apparatus acquires a disparity between pixel points on the line using, for example, a softmax layer of a neural network and a regression algorithm and additionally acquires depths of all pixel points on the road. The output apparatus acquires matching information, for example, a matching value matrix, and then, calculates a probability that each of the pixel points in the image corresponds to all disparity values using the softmax layer. Hereinafter, the probability that each of the pixel points in the image corresponds to all disparity values may also be referred to as "correspondence probability". The output apparatus may cumulatively obtain a sum by multiplying all disparities of the pixel points by the correspondence probability. The output apparatus generates a disparity map based on a cumulative sum and predicts depth values of lines.

Figure 3:
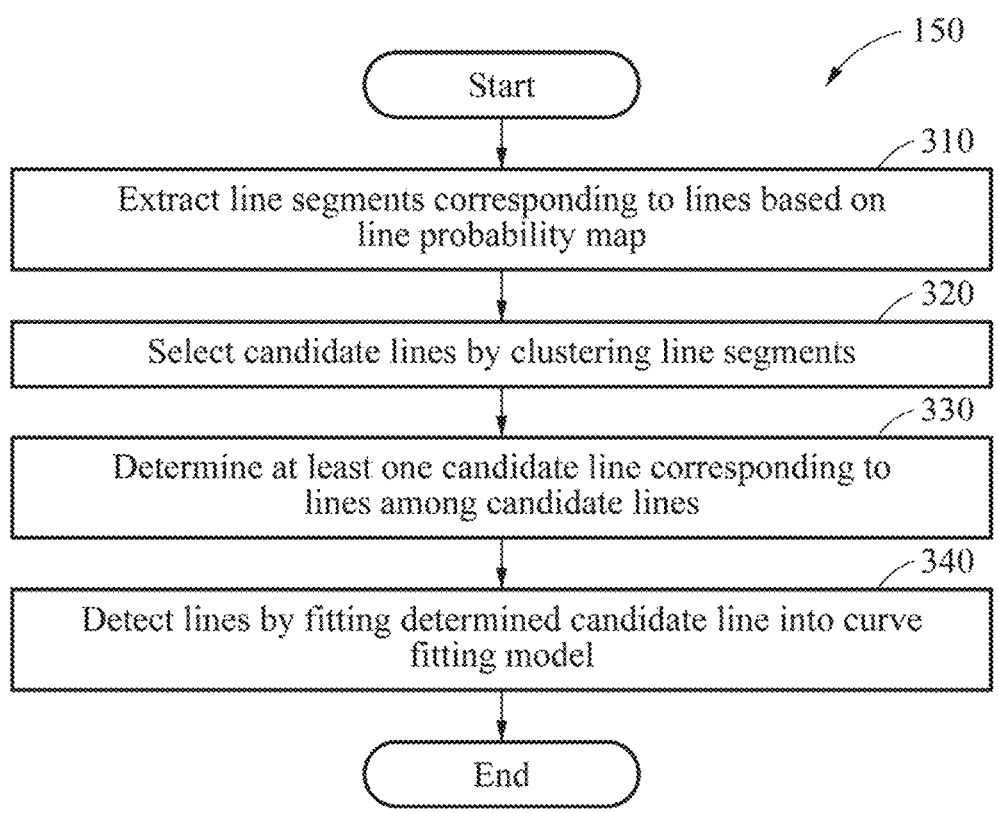
FIG. 3 illustrates an example of a method of detecting lines based on a line probability map.

FIG. 3 is a flowchart illustrating an example of a method of detecting lines based on a line probability map. Referring to FIG. 3, in operation 310, an output apparatus extracts line segments corresponding to lines based on a line probability map. The output apparatus extracts pixel points located on a line from the line probability map. The output apparatus calculates distances between the extracted pixel points. The output apparatus acquires sub-segments by combining the extracted pixel points based on the distances between the pixel points. The output apparatus extracts the line segments by connecting the sub-segments based on a distance between the sub-segments. When a distance between two adjacent sub-segments is less than a reference value, the output apparatus may obtain a line segment by connecting the two sub-segments to be a single segment. The output apparatus may combine the sub-segments by fitting pixel points of the two sub-segments into one new line or line segment using a secondary curve equation, for example, a B-spline curve fitting method.

In operation 320, the output apparatus selects candidate lines by clustering the line segments. The output apparatus calculates an energy function corresponding to each combination of line segments included in a candidate line set based on, for example, lengths of the line segments. The output apparatus selects at least one combination of the line segments based on whether the energy function satisfies a preset condition. The output apparatus clusters the line segments by performing curve fitting on the line segments based on the selected combination. The output apparatus selects the clustered line segments as the candidate lines. A method of selecting candidate lines using the output apparatus will be described in detail with reference to FIG. 4.

In operation 330, the output apparatus determines at least one candidate line corresponding to the lines among the candidate lines. The output apparatus calculates, for example, a distance from each of the candidate lines and a previous line included in a previous line set. The output apparatus calculates a matching score by matching each of the lines and the previous line based on the distance between the each of the candidate lines and the previous line. The output apparatus determines at least one candidate line corresponding to the lines based on the matching score. A method of determining at least one candidate line using the output apparatus will be described in detail with reference to FIG. 5.

In operation 340, the output apparatus detects lines by fitting the determined candidate line into, for example, a curve fitting model.

Figure 4:
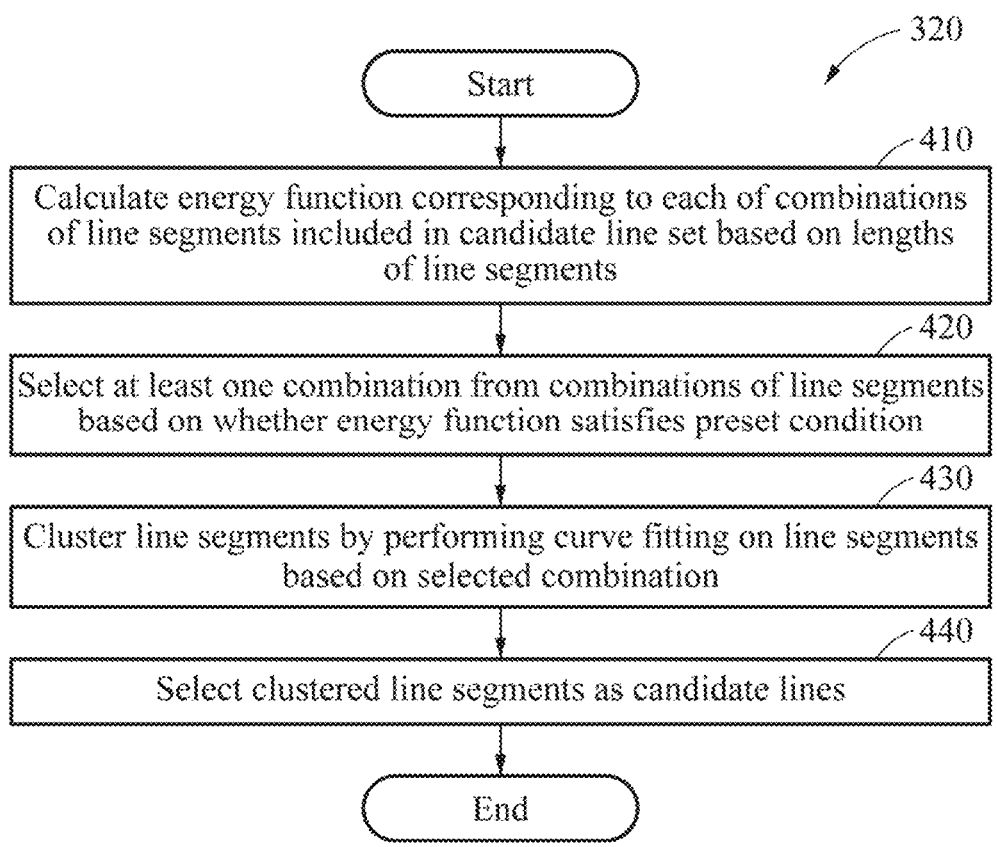
FIG. 4 illustrates an example of a method of selecting candidate lines.

FIG. 4 is a flowchart illustrating an example of a method of selecting candidate lines. Referring to FIG. 4, in operation 410, an output apparatus calculates an energy function corresponding to each of combinations of line segments included in a candidate line set based on lengths of the line segments. The candidate line set is, for example, a set including line segments having lengths greater than a threshold length. The length of each of the line segments may be expressed as "line segment length=line segment length/coefficient". Here, the coefficient may be a preset value such as 15, 20, and 25, for example.

The output apparatus calculates an energy function corresponding to each combination of line segments included in a candidate line set. For example, a candidate line set may include three line segments. In this example, combinations of the line segments may be a combination of the three line segments, a combination of a predetermined line segment and two remaining line segments, and a combination of a predetermined line segment, another line segment, and the other line segment.

The output apparatus uses, for example, a CRF graph to calculate the energy function corresponding to each combination of the line segments included in the candidate line set. The CFR graph is a graph representing a probability that labels or delimits boundaries of structured data such as a continuous tree or grid. The CFR graph is based on a conditional property required to make a conclusion, and may have improved accuracy in comparison to an independent assumption. When calculating the energy function of all combinations of the line segments, the output apparatus may construct the CRF graph with priority.

The output apparatus calculates a unitary function between the line segments and a pairing function with which the unitary function constitutes a pair based on the CRF graph. The unitary function is a function indicating a probability of two segments being associated with each other, and may be calculated based on a distance between the two segments. The unitary function may also be referred to as a unitary potential function. The output apparatus calculates the energy function based on the pairing function.

Pixel points of images may represent, for example, a relationship between line segments. The relationship between the line segments includes, for example, an angle difference $(CD_1-CD_m)^2$ between the segments and a distance $(C_{1,x}-C_{m,x})^2+(C_{1,y}-C_{m,y})^2$ between the segments. Here, $CD_1$ and $CD_m$ denote center-directional segments of a line segment 1 and a line segment m. $C_{1,x}$ and $C_{m,x}$ denote x coordinates of center pixel points of the line segment 1 and the line segment m. $C_{1,y}$ and $C_{m,y}$ denote y coordinates of the center pixel points of the line segment 1 and the line segment m. Also, edges of the images may represent a distance relationship between the pixel points.

The output apparatus calculates a unitary function between the line segments and a pairing function with which the unitary function constitutes a pair based on the CRF graph. The output apparatus calculates the energy function based on the unitary function and the pairing function. Here, the unitary function is calculated based on a distance between two line segments, and may be a probability of the two line segments being associated with each other. For example, when the two line segments are 1 and m, a distance dist1 between the two line segments may be expressed as "$(C_{1.x}-C_{m.x})^2+(C_{1.y}-C_{m.y})^2+(CD_1-CD_m)^2$". In this example, the unitary function between the line segments may be expressed as "$-\ln(1/(1+\exp(-dist1)))$".

Also, with respect to a line set of one group, lines of the group may be fit using one polynomial expression $f(x)$. A distance dist2 between each of the lines of the group and the polynomial expression $f(x)$ used for the fitting may be expressed as "$(f(x_1)-y_1)^2$" in which $(x_1, y_1)$ denotes a pixel point of the line and $f(x_1)$ denotes a value obtained by fitting the pixel point using the polynomial expression. In this example, a pairing function of the unitary function may be, for example, $-\ln(1/(1+\exp(dist2)))$. An energy function between the line segments may be calculated as, for example, $-\ln(1/(1+\exp(-dist1)))-\ln(1/(1+\exp(dist2)))$.

Depending on an example, the output apparatus may use a Markov random field (MRF) to calculate an energy function corresponding to each combination of the line segments.

In operation 420, the output apparatus selects at least one combination from the combinations of the line segments based on whether the energy function satisfies a preset condition. The preset condition is, for example, a condition that minimizes the energy function, that is, a condition that the energy function has a value less than a preset reference value.

In operation 430, the output apparatus clusters the line segments by performing curve fitting on the line segments based on the selected combination.

In operation 440, the output apparatus selects the clustered line segments as the candidate lines.

Figure 5:
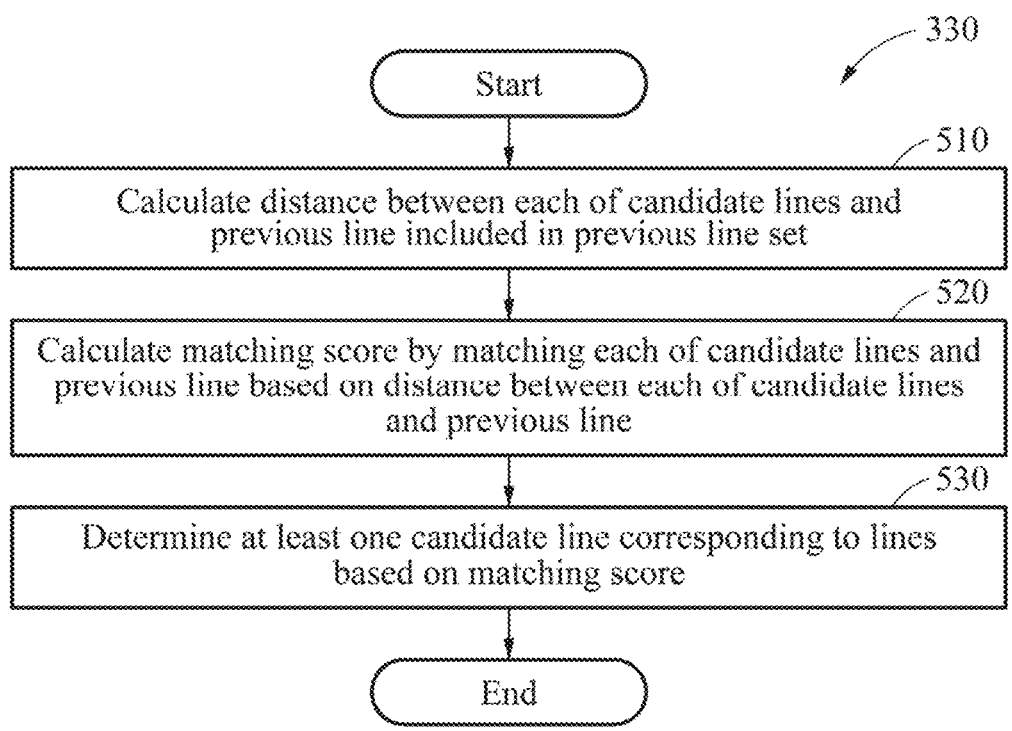
FIG. 5 illustrates an example of a method of determining at least one candidate line.

FIG. 5 is a flowchart illustrating an example of a method of determining at least one candidate line. Referring to FIG. 5, in operation 510, an output apparatus calculates a distance between each of the candidate lines and a previous line included in a previous line set. The binary line set may be a set including line segments acquired from image frames of a point in time previous to a current point in time. Also, the previous line included in the previous line set may be a line or a line segment acquired based on a line identification result among the image frames of the previous point in time. Hereinafter, the image frames of the previous point in time are also referred to as "previous frames".

When matching each of the candidate lines and the previous line of the previous line set, the output apparatus calculates a distance between the corresponding candidate line and the previous line. Thereafter, the output apparatus matches the candidate line and the previous line based on the calculated distance. For example, a line A may be a candidate line of the candidate lines and a line B may be a previous line of the previous line set. In this example, a distance between the candidate line and the previous line may be calculated based on an average value of a distance from both end points of the line A to a straight line at which the line B is located and a distance from both end points of the line B to a straight line at which the line A is located.

In operation 520, the output apparatus calculates a matching score by matching each of the candidate lines and the previous line based on the distance between each of the candidate lines and the previous line. The output apparatus calculates the matching score by matching the previous line and a candidate line corresponding to a shortest distance.

In operation 530, the output apparatus determines at least one candidate line corresponding to the lines based on the matching score. The output apparatus arranges a candidate line that does not match the previous line, in the previous line set and sets an authenticity state of the candidate line to be verified. Depending on an example, the output apparatus may select a candidate line of which the authenticity state is "true".

The output apparatus excludes a line determined as a false positive by calculating a matching score based on a line identification result associated with previous frames and identifying a line of a worn road marking, thereby improving a line identification accuracy. The line determined as a false positive may correspond to a line which is not an actual line but is erroneously determined as a line.

Depending on an example, the output apparatus updates previous line information including the matching score based on a result of the matching between each of the candidate lines and the previous line. In addition to the matching score of the previous line, the previous line information may also include, for example, a start point, a center point, and an end point of the previous line, a start direction, a center direction, and an end direction of the previous line, a curve fitting coefficient, and an authenticity state of the previous line. The authenticity state of the previous line may indicate whether the previous line or a previous line segment corresponds to an actual line or an actual line segment. The authenticity state may be represented as, for example, "true", "false", and "to be checked".

The output apparatus updates the previous line information as follows. The output apparatus updates, for example, the matching score of the previous line. The output apparatus updates a value obtained by adding candidate line length/2 to the matching score of the previous line matching the candidate line, as the matching score of the previous line. The candidate line length may correspond to a segment length of the candidate line. Also, the output apparatus may reduce the matching score of the previous line that does not match the candidate line.

The output apparatus updates the authenticity state of the previous line. The output apparatus sets the authenticity state of the previous line to be "true" when the matching score of the candidate line and the previous line is greater than a first threshold. When the matching score of the candidate line and the previous line is less than a second threshold, the output apparatus sets the authenticity state of the previous line to be "false" or "to be checked".

Depending on an example, the output apparatus may remove the previous line from the previous line set.

FIG. 6 is a diagram illustrating an example of a structure of a multitask network outputting 3D lines. Referring to FIG. 6, a multitask network 600 includes a depth prediction model 610 and a line detection model 650. An output apparatus includes the multitask network 600. The multitask network 600 includes a plurality of neural networks required to complete different tasks, for example, generation of a line probability map and generation of a disparity map.

The depth prediction model 610 predicts a depth value of an image. The depth prediction model 610 includes a convolution neural network 605-2, a matching information calculating module 611, a smoothing module 613, and a matching information accumulating module 615.

The depth prediction model 610 receives a second image 602 corresponding to a right image and calculates matching information based on a first feature map and a second feature map acquired through a feature extracting module 605. The depth prediction model 610 outputs a disparity map 617 based on the matching information. The depth prediction model 610 generates the disparity map 617 based on the line probability map 652 generated in the line detection model 650.

The matching information calculating module 611 calculates matching information of the first image 601 and the second image 602 based on feature maps of a first image 601 and the second image 602.

The smoothing module 613 and the matching information accumulating module 615 perform filtering on the matching information and remove abnormal pixel points corresponding to noise through the filtering, thereby improving a matching accuracy.

The smoothing module 613 receives a binary image mask of a line probability map 652 and predicts depth values of lines based on an attention mechanism. When predicting the depth values of the lines, the smoothing module 613 focuses more on a depth of a registered line area, for example, a depth of a previous line included in a previous line set to reduce an amount of calculation.

The matching information accumulating module 615 is trained based on a difference between a value of a disparity between the first image and a second image and a disparity value of an overall image calculated based on a regression algorithm, for example. A training method of the matching information accumulating module 615 and a process of outputting a disparity map will be described with reference to FIG. 7. Also, a configuration of neural networks included in the depth prediction model 610 and a learning method thereof will be described with reference to FIG. 8.

The line detection model 650 performs a line detection. The line detection model 650 receives the first image 601 corresponding to a left image and generates the line probability map 652. The line detection model 650 detects lines based on a line probability map 613 and outputs the lines. The line detection model 650 includes the CNN 605-1 of the feature extracting module 605 and an encoder-decoder network 651.

The feature extracting module 605 is shared by the depth prediction model 610 and the line detection model 650. The feature extracting module 605 shares a weight of the depth prediction model 610 and the line detection model 650.

The feature extracting module 605 extracts features from the first image 601 and/or the second image 602. Features of an image may be classified into two dimensions, for example, a visual feature of a lower level and a semantic feature of an upper level. The visual feature of the lower level may include, for example, a pattern, a color, and a shape. Also, the semantic feature of the upper level may include, for example, a contour. The semantic feature is extracted by, for example, a deep neural network.

The encoder-decoder network 651 generates a line probability map based on the features extracted by the feature extracting module 605. The encoder-decoder network 651 is also referred to as "line probability map generating module". The encoder-decoder network 651 may include, for example, fully convolutional networks (FCN).

The encoder-decoder network 651 generates the line probability map 652 at a pixel level based on the semantic feature extracted by the feature extracting module 605. The generated line probability map is, for example, an initial line probability map. The initial line probability map indicates a probability that a pixel value belongs to lines but does not represent each of the lines.

In operation 653, the line detection model 650 extracts line segments using the initial line probability map.

The line detection model 650 clusters the line segments in operation 654, so that candidate lines are grouped into a candidate line set in operation 655. The line detection model 650 may classify candidate lines associated with each other in the candidate line set as a group.

In operation 656, the line detection model 650 calculates a matching score by matching each of the candidate lines included in the candidate line set and a previous line included in a previous line set based on a distance between the corresponding candidate line and the previous line. Through 3D stereo matching which ensures a subpixel accuracy, the line detection model 650 may increase an accuracy of line identification for an image including complex city road lines such as an intersection of a road, a road sign, a worn road marking, and an estimation of a distance from an object at a short distance and a long distance.

In operation 657, the line detection model 650 determines whether the matching is an optimal matching based on the matching score. The line detection model 650 determines whether the extracted line segment is an optimal matching for a condition of the previous line based on a previous image frame. When it is determined as the optimal matching in operation 657, the line detection model 650 performs line fitting by fitting a candidate line corresponding to the optimal matching into a curve fitting model in operation 658. The line detection model 650 performs the fitting using pixel points of which positions are connected to each other, for the curve fitting model. The line detection model 650 detects a line or lines through the line fitting in operation 659.

When it is not determined as the optimal matching in operation 657, the line detection model 650 updates a previous line set 607 in operation 660. The previous line set 607 may include previous lines detected based on previous frames 603.

The line detection model 650 may perform the line identification using a neural network, and may also perform an attention mechanism on the matching information by treating initial line information as one template during the line identification.

A process of generating the line probability map 652 by the line detection model 650 will be described with reference to FIG. 7. Also, a configuration of neural networks included in the depth prediction model 610 and a learning method thereof will be described with reference to FIG. 8.

Figure 7:
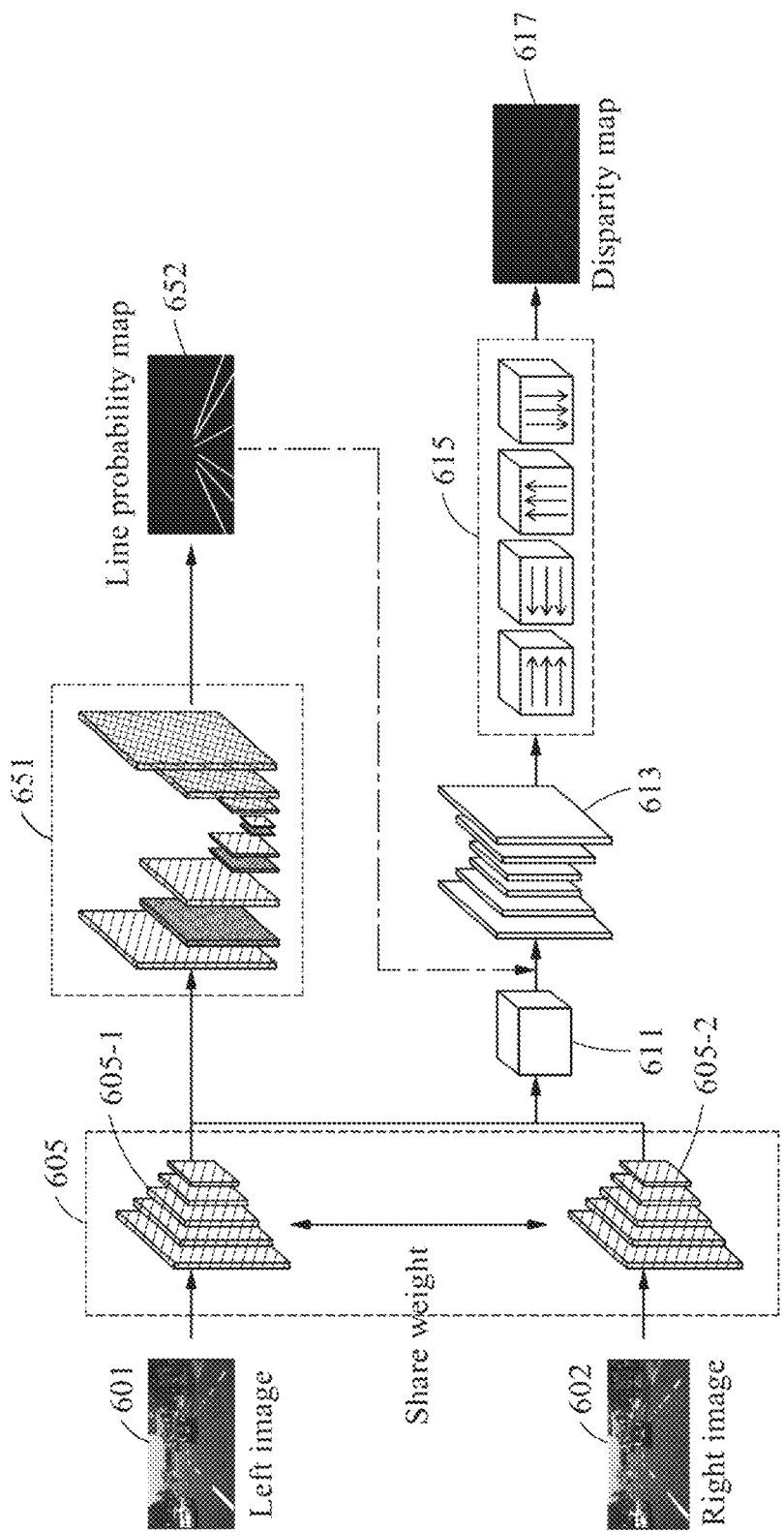
FIG. 7 illustrates an example of a process of generating a line probability map and a disparity map in a multitask network.

FIG. 7 is a diagram illustrating an example of a process of generating a line probability map and a disparity map in a multitask network. FIG. 7 illustrates a process of generating the disparity map 617 and the line probability map 652 from the first image 601 and the second image 602 by neural networks of the depth prediction model 610 and neural networks of a line detection model.

Figure 8:
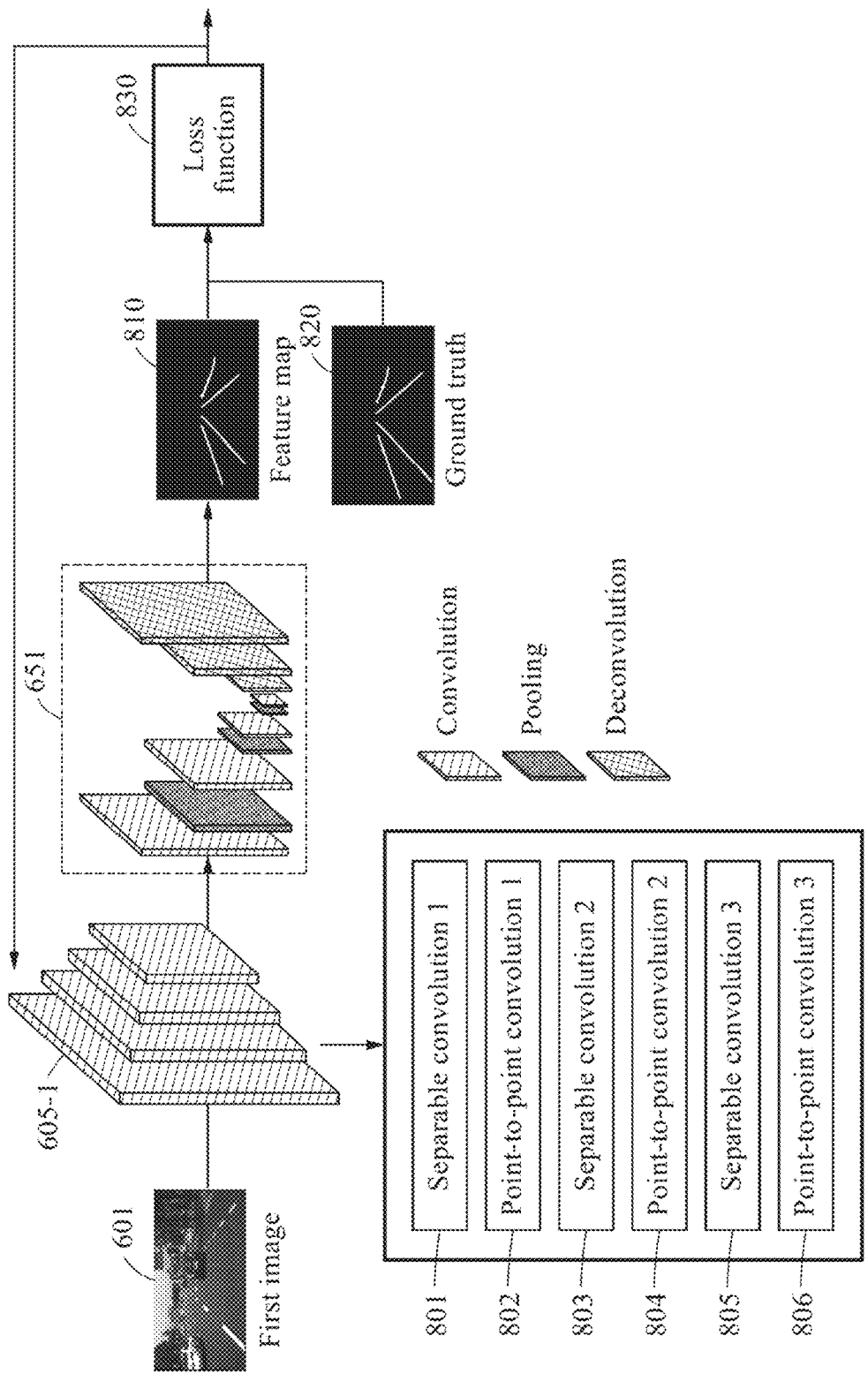
FIG. 8 illustrates an example of a configuration of neural networks included in a depth prediction model in a multitask network and a learning method thereof.

The feature extracting module 605 extracts semantic line features of an upper level from the first image 601 and/or the second image 602. The feature extracting module 605 includes the CNN 605-1 and a CNN 605-2. Depending on an example, the CNN 605-1 and the CNN 605-2 of the feature extracting module 605 may include, but not be limited to, VGG Net, GG Net, or GoogleNet, for example. Also, in order to extract a discriminative high-dimensional line feature and reduce a calculation time, the feature extracting module 605 may be configured in a manner of separating the convolution and a pointwise convolution, for example, a 1×1 convolution as illustrated in FIG. 8.

The feature extracting module 605 acquires a first feature map and a second feature map based on the line features extracted from the second image 602 or the first image 601

The feature extracting module 605 transfers the first feature map acquired from the first image 601 to the encoder-decoder network 651.

The encoder-decoder network 651 generates the line probability map 652 based on the first feature map. An encoder layer of the encoder-decoder network 651 may include, for example, a two-dimensional (2D) convolutional neural network and a pooling layer. The encoder layer performs deconvolution on a low resolution feature map of 160×90 dots per inch (dpi) into a line feature map of 1280×720 dpi resolution using, for example, a cavity convolutional kernel. Also, using dilated convolutional kernels, the encoder layer may extend a reception field of an encoder and ensure a low processing cost.

A decoder layer of the encoder-decoder network 651 may include a 2D deconvolutional neural network and an upsampling layer.

The matching information calculating module 611 receives the second feature map acquired from the second image and the first feature map from the feature extracting module 605. The matching information calculating module 611 calculates matching information of the first image and the second image based on the first feature map and the second feature map.

The smoothing module 613 acquires new matching information by overlaying the matching information output from the matching information calculating module 611 with the line probability map 652. The smoothing module 613 performs smoothing for adjacent pixel points by filtering the new matching information. The matching information accumulating module 615 acquires a disparity between the first image and the second image through a noise removal performed on a result of the smoothing.

The output apparatus generates the disparity map 617 based on the disparity output from the matching information accumulating module 615. A training method of the matching information accumulating module 615 may be as follows. The matching information accumulating module 615 is trained through a backpropagation of a difference $\hat{d}_n$ between an indicated disparity value and a disparity value of the entire image calculated based on a regression algorithm. The matching information accumulating module 615 is trained using Equation 2 as shown below.

$$\hat{d}_n = \Sigma_{di=0}^{Dmax} di \times \sigma(-c_d) \quad \text{Equation 2}$$

In Equation 2, di denotes a value in a disparity range. The disparity range is, for example, a range of 0 to $D_{max}$.

$D_{max}$ is a value representing the disparity range and has a preset value, for example, 10. $D_{max}$ indicates a maximum difference value between pixel points of the first image and the second image. $\sigma()$ denotes an operator of a softmax layer and $c_d$ denotes a value on a matching value matrix.

The matching information accumulating module 615 acquires a predicted disparity value $\hat{d}_n$ according to Equation 3 below.

$$\text{Loss} = \frac{1}{N} \sum_{n=1}^{N} \|d_n - \hat{d}_n\| \quad \text{Equation 3}$$

In Equation 3, $d_n$ denotes a predicted disparity value and N denotes a number of pixel points in an image.

FIG. 8 is a diagram illustrating an example of a configuration of neural networks included in a depth prediction model in a multitask network and a learning method thereof. FIG. 8 illustrates a configuration of the CNN 605-1 and a learning process of the CNN 605-1 and the encoder-decoder network 651.

The CNN 605-1 acquires a first feature map from the first image 601. In an example, an operator for extracting a feature of an image, for example, a Canny operator may be used to perform an edge detection on the first image 601 and acquire a first feature map.

The CNN 605-1 may be configured by separating separable convolutions 801, 803, and 805 from point-to-point convolutions, for example, pointwise convolutions 802, 804, and 806. The pointwise convolution may be a 1×1 convolution. When the CNN 605-1 is separated into a convolution and the pointwise convolution, a high-dimensional line feature may be extracted, and a calculation complexity and/or a processing cost may be reduced.

The encoder-decoder network 651 generates a line probability map 810 based on a first feature map output from the CNN 605-1. An output apparatus trains a parameter of the encoder-decoder network 651 or the CNN 605-1 through a backpropagation of a difference between the line probability map 810 generated by the encoder-decoder network 651 and ground truth data 820 representing a line feature of the first image 601. The difference between the line probability map 810 and the ground truth data 820 is measured using a loss function 830, which may increase an extraction accuracy in the CNN 605-1 and/or the encoder-decoder network 651. The loss function 830 is, for example, a cross entropy loss function.

Figure 9:
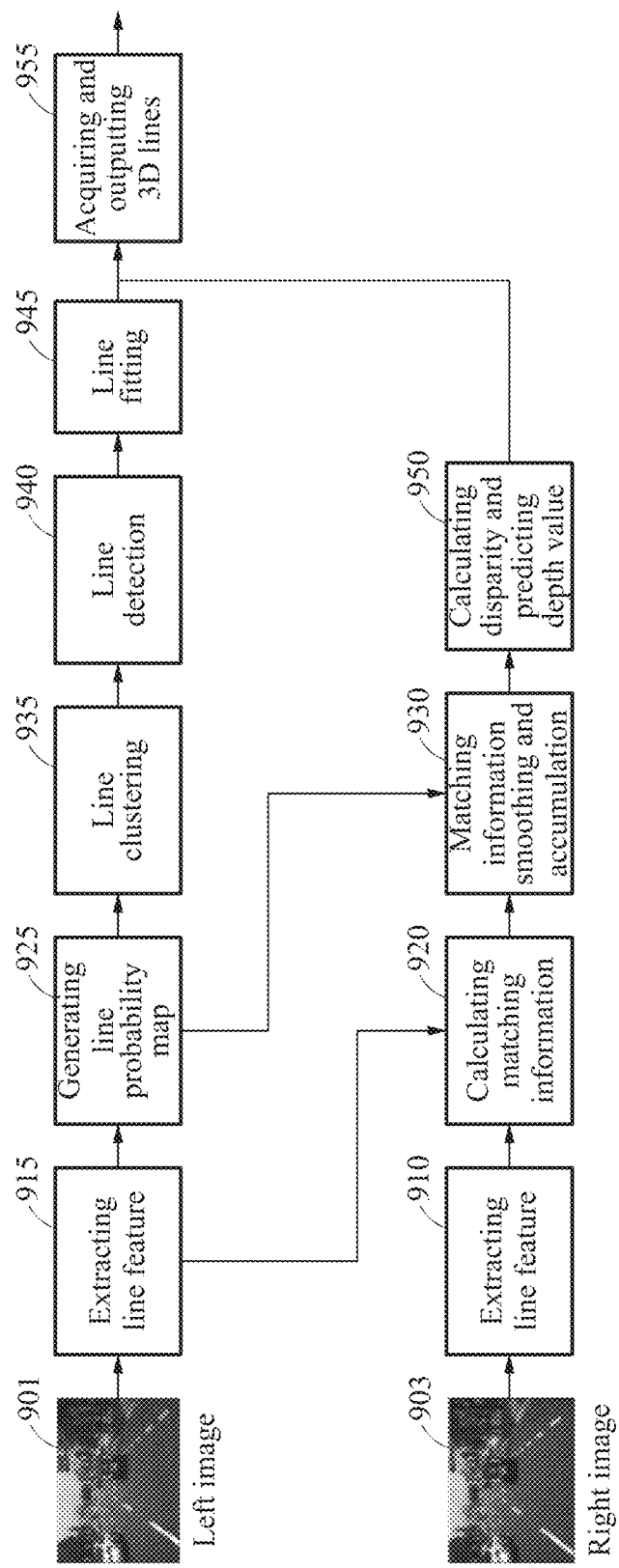
FIG. 9 illustrates an example of a process of generating 3D lines.

FIG. 9 is a diagram illustrating an example of a process of generating 3D lines. FIG. 9 illustrates a process of generating, by an output apparatus, 3D lines from a first image and a second image.

The output apparatus acquires a left image 901 and a right image 903 of a road. The output apparatus extracts a line feature from the right image 903 in operation 910 and acquires a second feature map based on the extracted line feature. Also, the output apparatus extracts a line feature from the left image 901 in operation 915 and acquires a first feature map based on the extracted line feature.

In operation 920, the output apparatus calculates matching information of the left image 901 and the right image 903 based on the first feature map and the second feature map. Also, in operation 925, the output apparatus generates a line probability map based on the first feature map. Here, operation 920 of calculating the matching information and operation 925 of generating the line probability map may be performed in an order illustrated in FIG. 9 or another order. Depending on an example, the output apparatus may generate the line probability map, and then calculate the matching information. Also, the output apparatus may generate the line probability map and calculate the matching information simultaneously.

In operation 930, the output apparatus performs smoothing and accumulation on the matching information. In operation 950, the output apparatus calculates a disparity based on a result of the smoothing and accumulation and predicts depth values of lines.

In operation 935, the output apparatus performs line clustering based on the line probability map. In operation 940, the output apparatus detects a line from a candidate line set using a clustered line set as a candidate line set. When performing line detection in operation 940, the output apparatus may determine whether the line is true or false based on a score system. In operation 940, the output apparatus may output a line set of which an authenticity is determined as "true", that is, a line set including line segments corresponding to an actual line.

The output apparatus generates a line by performing line fitting 945 based on a line detection result. When performing the line fitting, the output apparatus performs curve fitting on the line based on, for example, a curve fitting model. When performing the line fitting, the output apparatus receives the line set of which an authenticity is determined as "true", which has been acquired in the previous operation, to perform the line fitting and outputs a line set including newly fit lines.

In operation 955, the output apparatus acquires and/or outputs 3D lines based on the generated line and the depth values of the lines acquired in operation 950.

Figure 10:
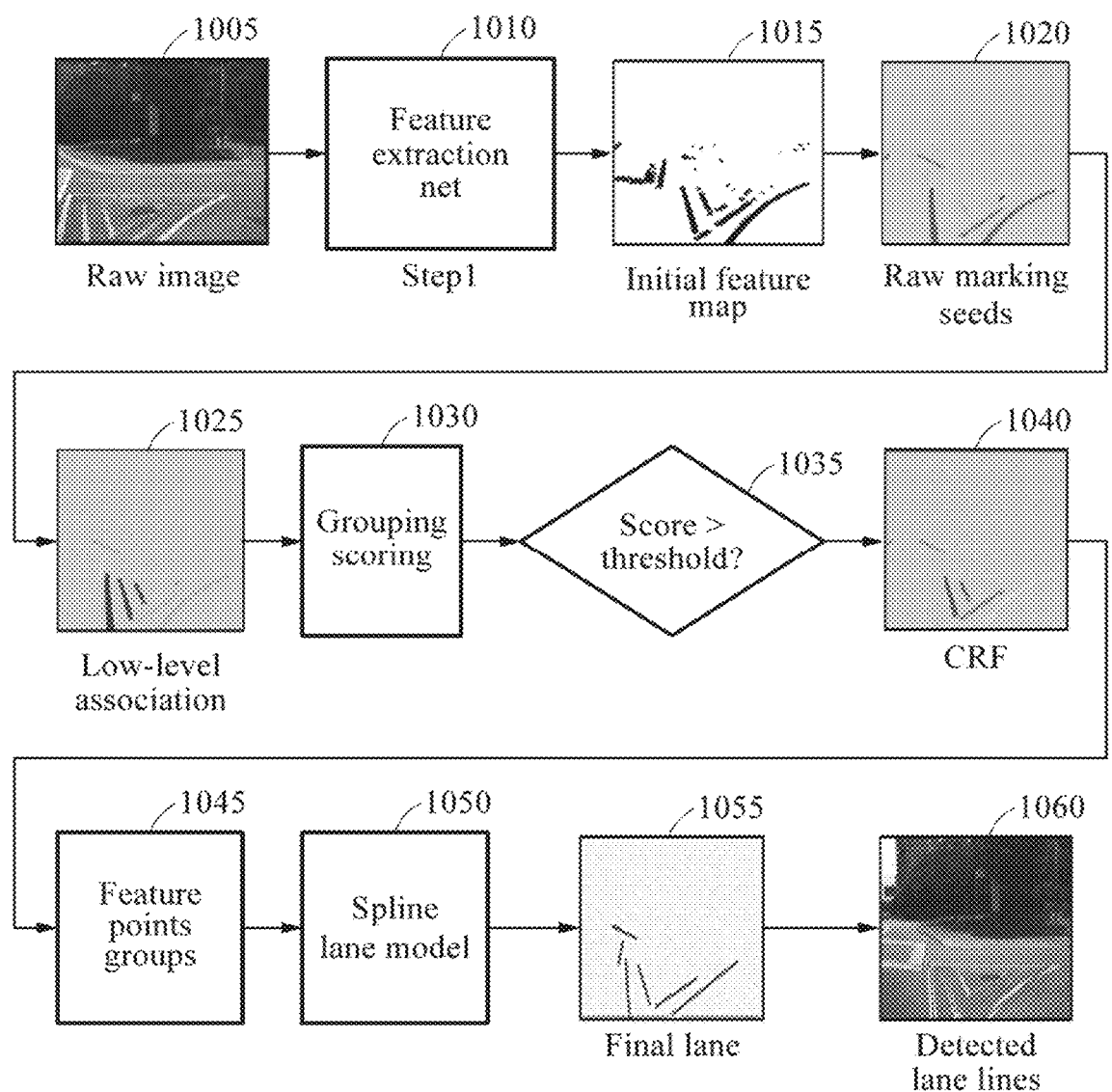
FIG. 10 illustrates an example of a method of clustering line segments using a conditional random fields (CRF) graph.

FIG. 10 is a diagram illustrating an example of a method of clustering line segments using a CRF graph. FIG. 10 illustrates a process of classifying various line markings using a CRF-associated algorithm.

When a raw image is received in operation 1005, an output apparatus extracts line features from the raw image through a feature extraction network in operation 1010. The output apparatus generates an initial feature map based on the line features in operation 1015. The output apparatus acquires raw marking seeds from the initial feature map in operation 1020. The raw marking seeds include various line segments marked in different colors. Positions of the line segments are represented by, for example, Head(hi), center (ci), and tail(ti). Also, angles of the line segments are represented by, for example, Head angle $\theta_{hi}$, center angle $\theta_{oi}$, and tail angle $\theta_{ti}$.

In operation 1025, the output apparatus performs low level association based on the raw marking seeds. The output apparatus groups obviously associated segments, for example, line segments adjacent within a predetermined distance and/or line segments having the same angle, thereby reducing a problem size, that is, a number of line segments to be processed.

The output apparatus calculates a score between the grouped line segments in operation 1030 and determines whether the score is greater than a preset reference value in operation 1035. The score may be a score representing a degree of matching or a matching rate between the grouped line segments.

In operation 1040, the output apparatus generates a CRF graph by performing a CRF-associated algorithm for classifying various line markings based on a determination result obtained in operation 1035. The CRF graph may be represented as, for example, G=(V; E) in which V denotes a vertex which indicates an association of line markings, and E denotes an edge which indicates a presence of correlation or association between line markings.

In operation 1045, the output apparatus groups feature points by generating a final association result between the line markings through energy minimization based on the CRF graph.

The output apparatus fits the grouped feature points into a line or line segments using a spline model in operation 1050. Through this, the output apparatus acquires a final line in operation 1055. The spline model may be a secondary curve equation such as a B-spline curve fitting model, for example.

The output apparatus detects lines from the raw image using the final line in operation 1060.

FIG. 11 is a diagram illustrating an example of a program coding that represents a method of identifying a line and excluding a line determined as false positive based on a matching score. Referring to FIG. 11, it is possible to exclude a line determined as a false positive by calculating a matching score based on a line identification result of previous frames among lines and identify a line of a worn road marking, thereby improving a line identification accuracy.

Figure 12:
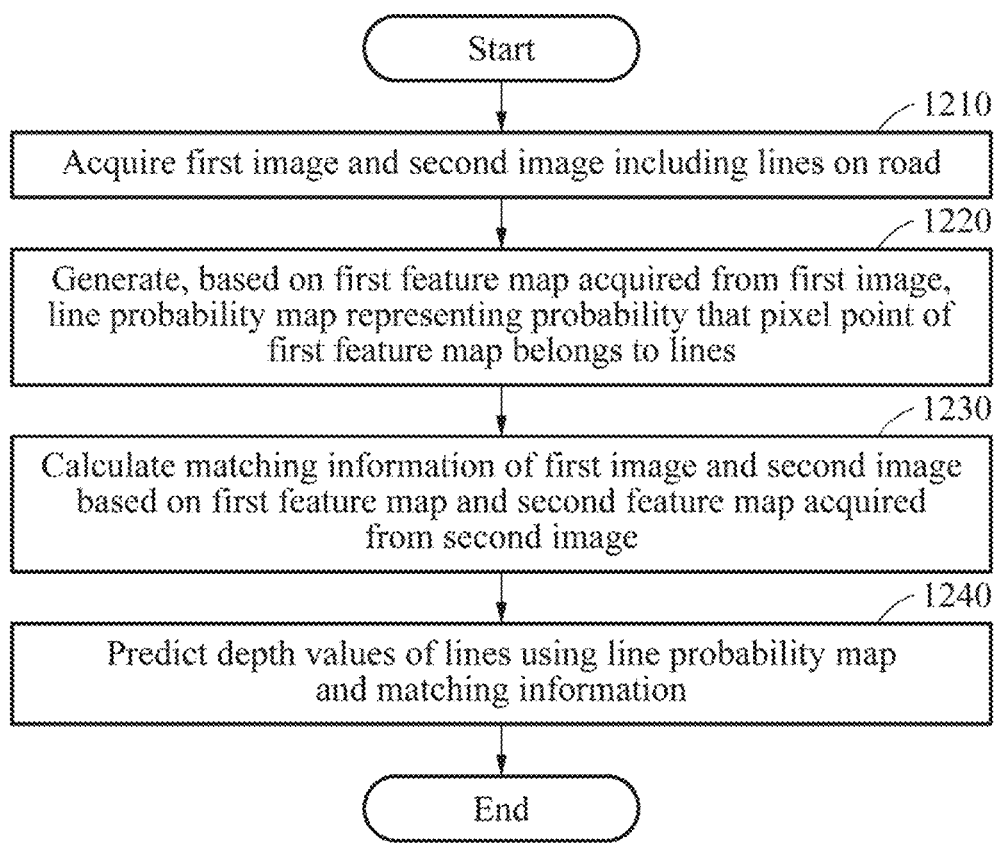
FIG. 12 illustrates an example of a method of predicting depth values of lines.

FIG. 12 is a flowchart illustrating an example of a method of predicting depth values of lines. Referring to FIG. 12, in operation 1210, an output apparatus acquires a first image and a second image including lines on a road.

In operation 1220, the output apparatus generates, based on a first feature map acquired from the first image, a line probability map representing a probability that a pixel point of the first feature map belongs to the lines.

In operation 1230, the output apparatus calculates matching information of the first image and the second image based on the first feature map and a second feature map acquired from the second image.

In operation 1240, the output apparatus predicts depth values of the lines using the line probability map and the matching information.

Figure 13:
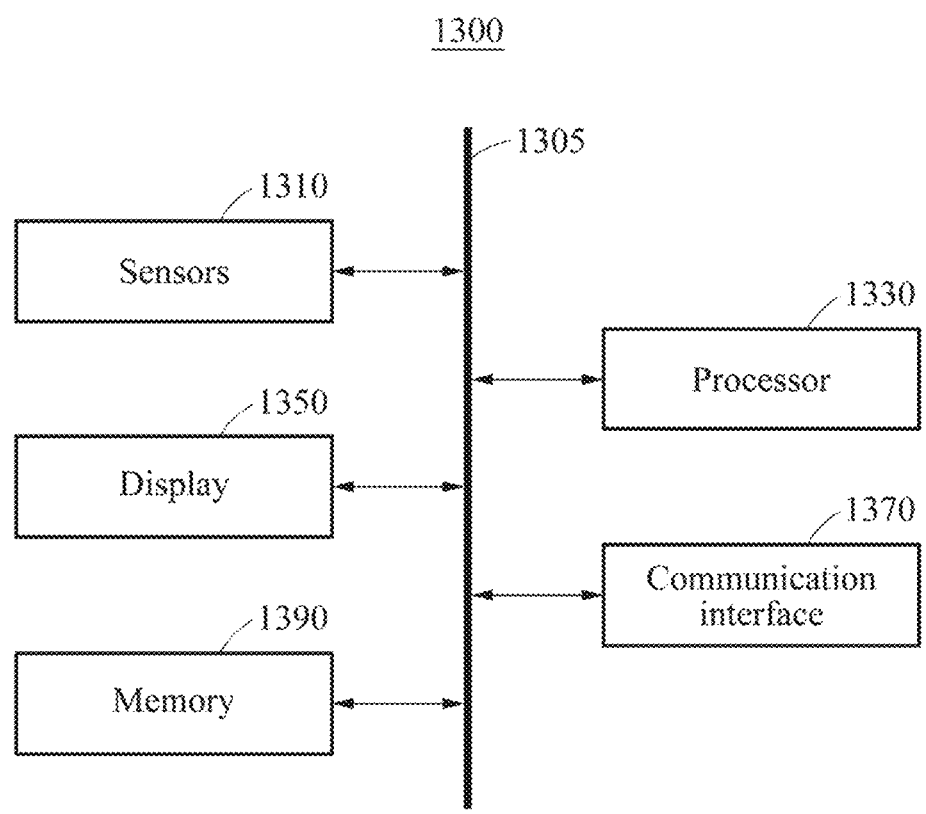
FIG. 13 illustrates an example of an apparatus for outputting 3D lines.

FIG. 13 is a block diagram illustrating an example of an apparatus for outputting 3D lines. Referring to FIG. 13, an apparatus 1300 for outputting 3D lines includes sensors 1310, at least one processor 1330, a display 1350, a communication interface 1370, and a memory 1390. The sensors 1310, the at least one processor 1330, the display 1350, the communication interface 1370, and the memory 1390 may communicate with one another through a communication bus 1305.

The sensors 1310 capture a first image and a second image including lines on a road. The first image and the second image may be, for example, two-dimensional (2D) images. The sensors 1310 include a first sensor that captures the first image and a second sensor that captures the second image. The first sensor and the second sensor may be located in the same horizontal line on a vehicle. The sensors 1310 include, for example, an image sensor, a vision sensor, and a camera sensor.

The at least one processor 1330 generates a line probability map based on a first feature map acquired from the first image. The line probability map is a probability that a pixel point of the first feature map belongs to the lines. The at least one processor 1330 calculates matching information of the first image and the second image based on the first feature map and a second feature map acquired from the second image. The at least one processor 1330 includes, for example, a first neural network to extract first line features from the first image and/or a second neural network to extract second line features from the second image. The first neural network and the second neural network share weight parameters. Depending on an example, the first neural network and the second neural network may each be configured as a convolutional neural network.

The at least one processor 1330 predicts depth values of the lines using the line probability map and the matching information. The at least one processor 1330 detects the lines based on the line probability map. The at least one processor 1330 generates 3D lines based on the detected lines and the depth values of the lines. The at least one processor 1330 may generate the 3D lines on the first image corresponding to the 2D image captured by the sensors 1310 and/or the second image corresponding to the 2D image captured by the sensors 1310. The at least one processor 1330 may also generate the 3D lines on a separate 3D map.

The at least one processor 1330 outputs the 3D lines using the display 1350 and/or the communication interface 1370.

The display 1350 is, for example, a head-up display or an augmented reality (AR) head-up display.

The communication interface 1370 receives captured images from an outside of the apparatus 1300 except for the sensors 1310, or transmits 3D lines generated and output by the at least one processor 1330.

The at least one processor 1330 performs at least one of the methods described with reference to FIGS. 1 through 12 or an algorithm corresponding to at least one of the methods. The at least one processor 1330 may be a hardware-implemented data processing device having a circuit that is physically structured to execute desired operations. For example, the desired operations include code or instructions included in a program. The hardware-implemented data processing device includes, but is not limited to, for example, a microprocessor, a central processing unit (CPU), a processor core, a multi-core processor, a multiprocessor, an application-specific integrated circuit (ASIC), and a field-programmable gate array (FPGA).

The at least one processor 1330 executes a program and controls the apparatus 1300. Codes of the program executed by the at least one processor 1330 are stored in the memory 1390.

The memory 1390 stores various information generated during a processing operation of the at least one processor 1330. The memory 1390 stores, for example, a first feature map, a second feature map, matching information between a first image and a second image, a line probability map, depth values of lines, and 3D lines.

In addition, the memory 1390 stores a variety of data and programs. The memory 1390 includes a volatile memory or a non-volatile memory. The memory 1390 includes a large-capacity storage medium such as a hard disk to store the variety of data.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of outputting three-dimensional (3D) lines, the method comprising:
   acquiring a first image including lines on a road and a second image including the lines on the road;
   generating, based on a first feature map acquired from the first image, a line probability map representing a probability that a pixel point of the first feature map belongs to the lines;
   calculating matching information of the first image and the second image based on the first feature map and a second feature map acquired from the second image;
   predicting depth values of the lines using the line probability map and the matching information;
   detecting the lines based on the line probability map;
   generating 3D lines based on the detected lines and the depth values of the lines; and
   outputting the 3D lines.

2. The method of claim 1, wherein generating the line probability map comprises:
   extracting a line segment on the first feature map;
   generating a binary image representing a probability that a pixel point of the first feature map belongs to the lines based on the line segment; and
   generating the line probability map based on the binary image.

3. The method of claim 1, wherein calculating the matching information of the first image and the second image comprises:
   calculating a correlation coefficient of pixel points included in the first feature map and pixel points included in the second feature map; and
   calculating the matching information of the first image and the second image based on the correlation coefficient.

4. The method of claim 1, wherein predicting the depth values of the lines comprises:
   calculating a disparity between the first image and the second image based on the line probability map and the matching information; and
   predicting the depth values of the lines according to a disparity map based on the disparity.

5. The method of claim 4, wherein calculating the disparity comprises:
   acquiring new matching information by overlaying the matching information with the line probability map;
   smoothing adjacent pixel points by filtering the new matching information, and removing noise of the new matching information; and
   acquiring the disparity between the first image and the second image based on a result of the smoothing and removing.

6. The method of claim 1, wherein detecting the lines based on the line probability map comprises:
   extracting line segments corresponding to the lines based on the line probability map;
   selecting candidate lines by clustering the line segments;
   determining at least one candidate line corresponding to the lines among the candidate lines; and
   detecting the lines by fitting the determined at least one candidate line into a curve fitting model.

7. The method of claim 6, wherein extracting the line segments comprises:
   extracting pixel points on a line from the line probability map;
   calculating distances between the extracted pixel points;
   acquiring sub-segments by combining the extracted pixel points based on the distances between the extracted pixel points; and
   extracting the line segments by connecting the sub-segments based on a distance between the sub-segments.

8. The method of claim 6, wherein selecting the candidate lines by clustering the line segments comprises:
   calculating an energy function corresponding to each of combinations of line segments included in a candidate line set based on lengths of the line segments, the candidate line set including line segments having lengths greater than a threshold length;
   selecting at least one combination from the combinations of the line segments based on whether the energy function satisfies a preset condition;
   clustering the line segments by performing curve fitting on the line segments based on the selected combination; and
   selecting the clustered line segments as the candidate lines.

9. The method of claim 8, wherein calculating the energy function comprises:
   calculating an energy function corresponding to each of combinations of line segments included in the candidate line set.

10. The method of claim 8, wherein calculating the energy function comprises:
    calculating an energy function corresponding to each of combinations of the line segments using a conditional random fields (CRF) graph.

11. The method of claim 10, wherein calculating the energy function comprises:
calculating a unitary function between the line segments and a pairing function with which the unitary function constitutes a pair based on the CRF graph; and
calculating the energy function based on the unitary function and the pairing function.

12. The method of claim 6, wherein determining at least one candidate line corresponding to the lines among the candidate lines comprises:
calculating a distance between each of the candidate lines and a previous line included in a previous line set;
calculating a matching score by matching each of the candidate lines and the previous line based on the distance between each of the candidate lines and the previous line; and
determining at least one candidate line corresponding to the lines based on the matching score.

13. The method of claim 12, further comprising:
updating information on the previous line including the matching score based on a result of the matching between each of the candidate lines and the previous line.

14. The method of claim 13, wherein updating the information on the previous line comprises at least one of:
updating a matching score of the previous line;
updating an authenticity state of the previous line indicating whether the previous line corresponds to an actual line; and
removing the previous line from the previous line set.

15. The method of claim 1, wherein acquiring the first image and the second image comprises:
capturing the first image and the second image using a stereo camera or using two cameras located at a same horizontal position on a vehicle.

16. The method of claim 1, further comprising:
extracting first line features from the first image using a first neural network;
acquiring the first feature map based on the first line features;
extracting second line features from the second image using a second neural network; and
acquiring the second feature map based on the second line features.

17. The method of claim 16, wherein the first neural network and the second network share weight parameters.

18. The method of claim 16, wherein acquiring the first feature map and the second feature map comprises:
acquiring the first feature map and the second feature map by performing an edge detection on each of the first image and the second image.

19. A method of predicting depth values of lines, the method comprising:
acquiring a first image including lines on a road and a second image including the lines on the road;
generating, based on a first feature map acquired from the first image, a line probability map representing a probability that a pixel point of the first feature map belongs to the lines;
calculating matching information of the first image and the second image based on the first feature map and a second feature map acquired from the second image; and
predicting depth values of the lines using the line probability map and the matching information.

20. The method of claim 19, wherein generating the line probability map comprises:
extracting a line segment on the first feature map;
generating a binary image representing a probability that a pixel point of the first feature map belongs to the lines based on the line segment; and
generating the line probability map based on the binary image.

21. The method of claim 19, wherein calculating the matching information of the first image and the second image comprises:
calculating a correlation coefficient of pixel points included in the first feature map and the second feature map; and
calculating the matching information of the first image and the second image based on the correlation coefficient.

22. The method of claim 19, wherein predicting the depth values of the lines comprises:
calculating a disparity between the first image and the second image based on the line probability map and the matching information; and
predicting the depth values of the lines according to a disparity map based on the disparity.

23. The method of claim 22, wherein calculating the disparity comprises:
acquiring new matching information by overlaying the matching information with the line probability map;
smoothing adjacent pixel points by filtering the new matching information, and removing noise of the new matching information; and
acquiring the disparity between the first image and the second image based on a result of the smoothing and removing.

24. A non-transitory computer-readable storage medium storing instructions that, when executed by a processor, cause the processor to perform the method of claim 1.

25. An apparatus for outputting three-dimensional (3D) lines, the apparatus comprising:
sensors configured to acquire a first image including lines on a road and a second image including the lines on the road; and
a processor configured to generate, based on a first feature map acquired from the first image, a line probability map representing a probability that a pixel point of the first feature map belongs to the lines, calculate matching information of the first image and the second image based on the first feature map and a second feature map acquired from the second image, predict depth values of the lines using the line probability map and the matching information, detect the lines based on the line probability map, generate 3D lines based on the detected lines and the depth values of the lines, and output the 3D lines.

* * * * *